United States Patent

[11] 3,632,289

| [72] | Inventor | Mead S. Moores<br>Wilmington, Del. |
|---|---|---|
| [21] | Appl. No. | 812,426 |
| [22] | Filed | Apr. 1, 1969 |
| [45] | Patented | Jan. 4, 1972 |
| [73] | Assignee | E. I. du Pont de Nemours and Company<br>Wilmington, Del. |

[54] STABLE SOLUTIONS OF 4,4'-BIS(DIETHYLAMINO)-BENZOPHENONIMINE HYDROCHLORIDE
4 Claims, No Drawings

[52] U.S. Cl. ................................................. 8/7,
8/79, 8/85, 8/93, 8/92, 162/162
[51] Int. Cl. ........................................................ D21h 1/46
[50] Field of Search ........................................... 8/7, 79, 92,
93, 85, 172; 260/566

[56] References Cited
UNITED STATES PATENTS

| 1,635,628 | 7/1927 | Luttin............................ | 8/92 |
| 2,901,312 | 8/1959 | Audas............................ | 8/172 X |
| 2,930,670 | 3/1960 | Bradshaw et al............... | 8/85 |
| 3,098,013 | 7/1963 | Austin et al.................... | 8/85 X |
| 3,373,199 | 3/1968 | Cohen et al..................... | 260/566 |

*Primary Examiner*—George F. Lesmes
*Assistant Examiner*—Patricia C. Ives
*Attorney*—Louis H. Rombach

ABSTRACT: Storage-stable concentrated solutions, and their preparation, of up to 45 weight percent 4,4'-bis(diethylamino)-benzophenonimine hydrochloride in a mixture of 60–90 weight percent ethylene glycol and 10–40 weight percent urea.

STABLE SOLUTIONS OF 4,4'-BIS(DIETHYLAMINO)-BENZOPHENONIMINE HYDROCHLORIDE

BACKGROUND OF THE INVENTION

1. Field of the Invention

This invention relates to storage-stable concentrated solutions of 4,4'-bis(diethylamino)benzophenonimine hydrochloride, C.I. Basic Yellow 37 (C.I. 41001).

2. Description of the Prior Art

Auramine, the hydrochloride of 4,4'-bis(dimethylamino)benzophenonimine, C.I. Basic Yellow 2, C.I. 41000, is used in the art as a colorant for paper or paper pulp. A closely-related dye having similar utility is the hydrochloride of 4,4'-bis(diethylamino)benzophenonimine, C.I. Basic Yellow 37, C.I. 41001.

Although either of the above can be prepared and then isolated and sold as a solid product, in some instances it is advantageous to be able to market the dyes as solutions. For example, solutions can be pumped and metered accurately by the dyer, time is saved in dissolving the dye prior to use, and dusting and caking problems are avoided. These dyes are only slightly soluble in water (less than 1 wt. percent) and, moreover, hydrolyze rapidly to the ketone. There is some prior art on the preparation of solutions of auramine in fatty acids, for example, acetic acid or mixtures thereof with hydroxyacetic acid. Mixtures of fatty acids and water miscible organic solvents, for example, ethylene glycol, can be used. Such prior art solutions are toxic and corrosive, exhibit objectionable odors, and have rather high biological oxygen demands. Moreover, dissolution usually requires a two-step treatment: first, neutralization of the hydrochloride to the free base, and secondly, contacting of the free base with acid to effect dissolution.

There appears to be little if any art on the dissolution of 4,4'-bis(diethylamino)benzophenonimine hydrochloride.

SUMMARY OF THE INVENTION

It is an object of the present invention to provide storage-stable concentrated solutions of 4,4'-bis(diethylamino)benzophenonimine hydrochloride, which solutions avoid the objectionable features of prior art auramine solutions, and which solutions can be used directly in dyeing operations such as the dyeing of paper or paper pulp. These objectives are achieved by dissolving the dye in a mixture of ethylene glycol and urea. In such solutions the dye constitutes up to 45 weight percent and the solvent consists of a mixture of 60–90 weight percent glycol and 10–40 weight percent urea. Preferably, the solvent consists of about 70 weight percent glycol and about 30 weight percent urea and the solution contains about 40 weight percent of dye. The solutions of this invention are storage stable for extended periods from ambient temperature to about −7° C.

DESCRIPTION OF THE INVENTION

The present invention resides in storage-stable solutions of up to 45 weight percent 4,4'-bis(diethylamino)benzophenonimine hydrochloride in a solvent consisting of 60–90 weight percent ethylene glycol and 10–40 weight percent urea. Preferably, the dye comprises about 40 weight percent of the solution and the solvent consists of about 70 weight percent ethylene glycol and about 30 weight percent urea. The three components used to form the solution can be contacted with each other in any order and by any means commonly employed in dissolution operations. Usually, the glycol and urea will be admixed until the urea dissolves, after which the hydrochloride will be added. If desired, this operation can be followed by the addition of adjusting amounts of glycol or urea.

While it is not known whether the hydrochloride is retained as such in the solution, it has been discovered that the solution can be used directly in dyeing operations, with concentration calculations being based upon the dye in the hydrochloride form.

The storage-stable concentrated solutions of this invention are especially useful in the dyeing of paper pulp.

EXAMPLE

Preparation of Dye Solution

Thirty parts of urea and 70 parts of ethylene glycol were stirred together at 50–60 °C. until the urea dissolved. Seventy parts of 4,4'-bis(diethylamino)benzophenonimine hydrochloride were added and stirring was continued until the dye dissolved. Foreign matter was filtered off and the bulk of the deeply colored solution was allowed to cool to room temperature. The remaining portion of the hot solution was maintained at 50°C. for 1 week. During this time the dye remained in solution. The hot solution maintained its color strength at the elevated temperature (determined by spectrophotometric measurements).

A portion of the cooled solution from above was cooled further to −7° C. and held at this temperature for 1 week. Again there was no precipitation of the dye nor change of color strength.

The 4,4'-bis(diethylamino)benzophenonimine hydrochloride used above either was prepared by conventional techniques or was obtained from a commercial source. See, for example, Lynch and Reid, J. Am. Chem. Soc., 55, 2515 (1933).

Dyeing of Paper Pulp

To an aqueous slurry of 100 parts of bleached sulfite pulp in 5,000 parts of water at ambient temperature was added 1 part of the dye solution prepared above. Rosin and alum, 2 parts of each, were added and the mixture was agitated for 10–20 minutes. Water was added to give a total of 20,000 parts and the slurry was converted to yellow paper using conventional paper making techniques.

The embodiments of the invention in which an exclusive property or privilege is claimed are defined as follows:

1. A storage-stable solution of 4,4'-bis(diethylamino)benzophenonimine hydrochloride in a mixture of 60–90 weight percent ethylene glycol and 10–40 weight percent urea, said hydrochloride comprising up to 45 weight percent of the solution.

2. The solution of claim 1 wherein the hydrochloride comprises about 40 weight percent and the mixture consists of about 70 weight percent ethylene glycol and about 30 weight percent urea.

3. The process of preparing a storage-stable concentrated solution of 4,4'-bis(diethylamino)benzophenonimine hydrochloride, which process comprises dissolving up to 45 weight percent of the hydrochloride in a mixture of 60–90 weight percent ethylene glycol and 10–40 weight percent urea.

4. The process of claim 3 wherein about 40 weight percent of the hydrochloride is dissolved in a mixture of about 70 weight percent ethylene glycol and about 30 weight percent urea.

* * * * *